June 7, 1949.  O. E. WOLFF  2,472,358
FILM HOLDER

Filed Sept. 26, 1947  2 Sheets-Sheet 1

INVENTOR
Otto E. Wolff
BY Donald L. Brown
and Albert P. Davis
Attorneys

June 7, 1949. O. E. WOLFF 2,472,358
FILM HOLDER

Filed Sept. 26, 1947 2 Sheets-Sheet 2

INVENTOR
Otto E. Wolff
BY Donald L. Brown
and Albert P. Davis
Attorneys

Patented June 7, 1949

2,472,358

UNITED STATES PATENT OFFICE 2,472,358

FILM HOLDER

Otto E. Wolff, Cambridge, Mass., assignor to Polaroid Corporation, Cambridge, Mass., a corporation of Delaware Application September 26, 1947, Serial No. 776,326

8 Claims. (Cl. 95—66)

This invention relates to composite photographic film units and more particularly to improvements in composite photographic film units comprising a sheet of photosensitive material and another sheet of material adapted to be processed by spreading a liquid reagent between said sheet materials.

It has been proposed to process a layer of photosensitive material which has been differentially exposed to actinic light by spreading a liquid reagent between the surface of said photosensitive material and the surface of a second sheet of material whereby the liquid reagent differentially reacts with said photosensitive material. The copending application of Murry N. Fairbank, Serial No. 776,329, filed September 26, 1947, for Photographic product, discloses one form of composite photographic film unit comprising a photosensitive material adapted to be processed in the above-described manner.

It is one object of the present invention to provide a novel composite photographic film unit comprising a layer of photosensitive material which can be processed in the above-described manner.

It is a further object of the present invention to provide such a composite photographic film unit wherein said unit is so constructed and arranged that it can be easily and accurately positioned in the focal plane of a camera or other photographic apparatus in the presence of actinic light and the danger of accidentally exposing the photosensitive material therein is minimized.

It is a further object of the present invention to provide a novel composite photographic film unit comprising a sheet of photosensitive material, a second sheet of material, and a supply of liquid reagent which is adapted to be spread between the interface surfaces of said photosensitive material and said second sheet of material in a layer of uniform predetermined thickness, said unit being so constructed that the arrangement and proportion of the elements therein predetermine the thickness of the layer of liquid which will be spread.

It is a further object of the present invention to provide such a composite photographic film which is simple and easy to use, is compact and will occupy a minimum of space, and which can be manufactured easily, inexpensively, and accurately.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

To practice the above-described method of processing a photographic film unit it is desirable that a certain predetermined sequence of events take place. For example, it is desirable that the sheet of photosensitive material be located in the focal plane of a camera or other photographic apparatus with no opaque material between it and the lens and shutter of the camera or the equivalent exposure means in other photographic equipment. The photosensitive material is then exposed to actinic light to form therein a latent negative image. Following the formation of a latent negative image in the photosensitive material it is then desirable to bring a second sheet of material into face-to-face relation with the photosensitive material. Next, it is desirable to spread a predetermined quantity of a liquid reagent between the interface surfaces of the photosensitive material and the second sheet of material in a substantially uniform layer as, for example, by drawing the two sheets of material with said liquid located adjacent the leading edge of the latent image through pressure-applying means as, for example, a pair of rollers or a pair of barlike members spaced apart a predetermined distance.

The present invention comprises an envelope opaque to actinic light which removably carries a sheet of photosensitive material and a second sheet of material together with a predetermined quantity of liquid reagent. The envelope is sealed along all four of its edges to prevent actinic light from entering said envelope to fog the photosensitive material. The photosensitive material is so shaped along one of its edges that said one edge forms a cutting or tearing edge which is adapted to open the light-tight envelope when said envelope is pulled away from said photosensitive material to uncover the same after the composite film unit has been positioned in a camera or other photographic apparatus to make possible the exposure of said photosensitive material to form therein a latent negative image.

Figure 1:
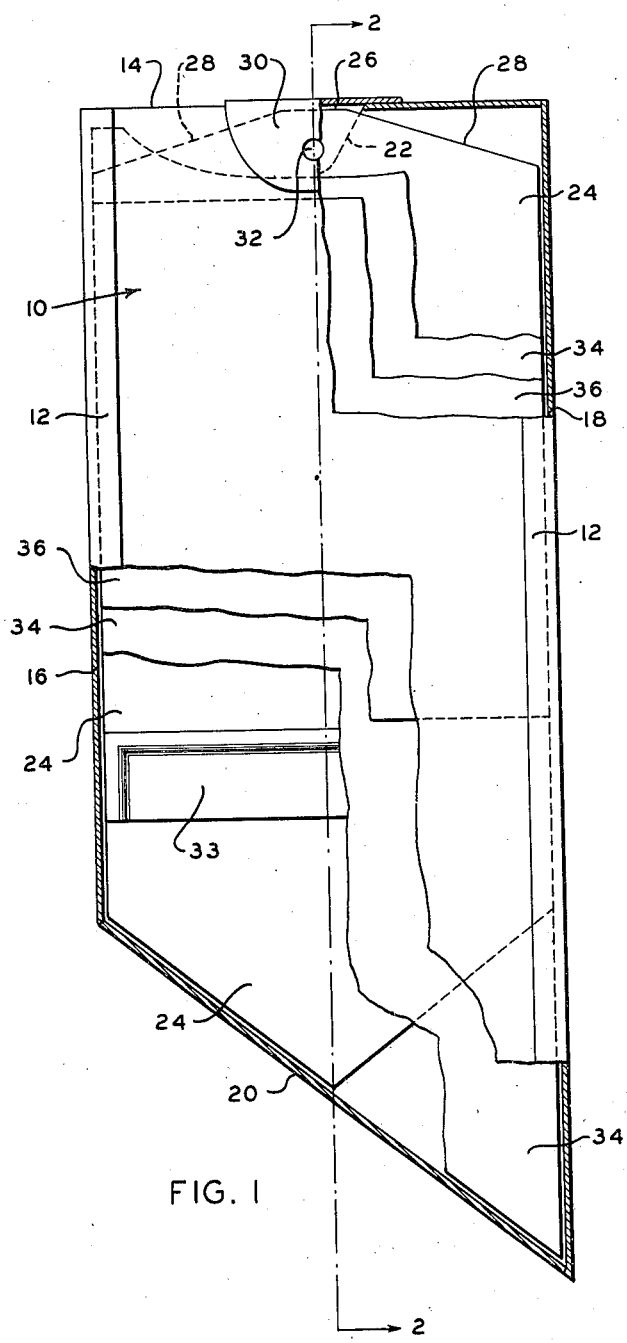
Figure 1 is a plan view, with parts broken away, to show details of construction, of a preferred embodiment of the composite photographic film unit of the present invention.
Figure 2:
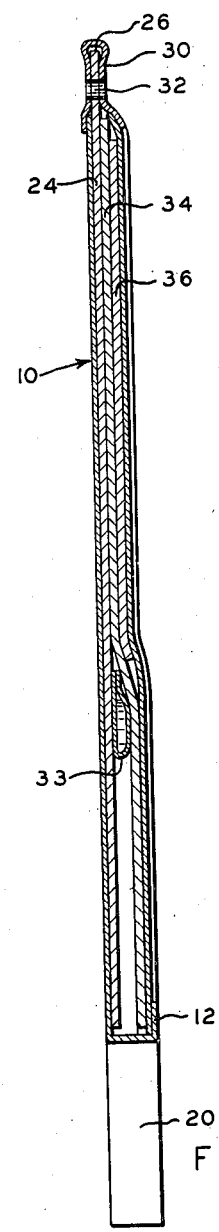
Fig. 2 is a sectional view taken along the line 2—2 of Fig. 1.

A preferred embodiment of the present invention is illustrated in Figs. 1 and 2 of the drawings wherein there is shown an envelope 10 preferably made from a material which is opaque to light which is actinic to the photosensitive material contained therein, as for example, a black tab stock. The envelope 10 which is trapezoidal in shape is formed by folding a strip of said opaque material transversely upon itself to form two walls and adhesively securing the three open edges together by means of sealing flaps 12 which are an integral part of one of said walls. The envelope 10 thus has a top edge 14 which is formed by the fold in the tab stock, two sealed side edges 16 and 18 which are parallel to each other and which extend from the edge 14 at substantially a right angle, and a sealed bottom edge 20 which forms an acute angle with the edge 18. The top edge 14 provided substantially at its center with a notch 22.

A sheet of photosensitive material 24 is carried by the envelope 10. The sheet of photosensitive material 24 may comprise a layer of any photosensitive material as, for example, silver halide, carried by a base layer of any suitable material as, for example, paper, cellulose acetate or cellulose nitrate. The width of said sheet of photosensitive material 24 is preferably slightly less than the width of the envelope 10 so that it can freely slide in and out of said envelope 10 after the edge 14 has been opened. The length of the photosensitive material 24 is preferably such that it extends from closely adjacent the upper edge 14 of the envelope 10 to substantially the midpoint of the lower edge 20. The lower edge of the sheet of photosensitive material 24, i. e., that edge which is adjacent the bottom edge 20 of the envelope 10 is cut to form two legs of an isosceles triangle, the angle of the apex being such that one leg extends substantially parallel and adjacent to the edge 20 of the envelope 10 for substantially one-half the length of said edge 20. The upper edge of the sheet of photosensitive material 24, i. e., that edge which is adjacent the upper edge 14 of the envelope 10 comprises a central portion 26 and two sloping portions 28. The central portion 26 is located in the notch 22 and the two portions 28 slope downwardly from each end of said central portion 26. A light seal 30 formed from a substantially elliptical piece of opaque material, preferably the same material as used to form the envelope 10, folded along its transverse axis covers the notch 22 in the envelope 10 and laps over the envelope walls all around said notch 22. The light seal 30 is adhesively secured to both sides of the sheet of photosensitive material 24 in the area thereon uncovered by said notch 22. A perforation 32 forms an opening through the light seal 30 and the sheet of photosensitive material 24 in the notch 22.

The length of the sheet of photosensitive material 24 is such that when the composite photographic film unit is placed in a camera or other photographic apparatus with the perforation 32 placed over a pin or other engaging means located on one side of an exposure aperture the photosensitive material 24 will extend across the length of said exposure aperture and out of said camera or said other apparatus a sufficient distance to permit its being grasped and drawn therefrom. That area of the photosensitive material 24 which is adapted to extend across the exposure aperture when the composite photographic film unit is in a camera or other photographic apparatus constitutes an image area on said photosensitive material 24.

A liquid-carrying container 33, carrying a supply of liquid reagent, is adhesively secured to the sheet of photosensitive material 24 adjacent and parallel to the lower edge of the image area thereon but outside of said image area. Preferably the liquid-carrying container 33 is an envelope or saclike structure formed by folding a multilayer sheet of material upon itself and sealing the three edges thereof to form a liquid-carrying container which is impervious to the contained liquid and which is also impervious to oxygen and water vapor. The liquid-carrying container 33 thus formed is adapted, upon the application of a mechanical stress thereto, to break open along its longitudinal sealed edge and release its contained liquid. The multilayer sheet from which the liquid-carrying container 33 is formed preferably comprises a base layer of craft paper or fabric, an intermediate layer of metal foil such as a sheet of lead foil laminated to the base layer, and a third layer of heat-sealing plastic substantially impervious and inert to the liquid to be enclosed.

A second sheet of material 34 is carried by the envelope 10 and is preferably attached at its lower end to the inner surface of one of the walls of said envelope 10 so that one of its surfaces is in face-to-face relation with the sheet of photosensitive material 24. The sheet of material 34 has a shape generally conforming to the inner area of the envelope 10 but having its upper edge located adjacent the bottom of the notch 22. The sheet of material 34 may comprise any flexible material as, for example, paper, cloth, thin wood, metal, plastic or the material known to the art as baryta paper.

A third sheet of material 36 is carried by the envelope 10 and is located between the sheet of material 34 and its adjacent wall and is adhesively secured to said adjacent wall. The width of the sheet of material 36 is substantially equal to the width of the sheet of material 34 and its length slightly greater than the length of the predetermined image area on the sheet of photosensitive material 24. The sheet of material 36 is located longitudinally in the envelope 10 in superposed relation with the image area on the photosensitive material 24 and with its lower edge closely adjacent to the upper edge of the liquid-carrying container 33 but not overlying said upper edge. The sheet of material 36 is adapted to control the thickness of the layer of liquid composition spread between the sheet of photosensitive material 24 and the sheet of material 34 when the composite photographic film unit is processed by being drawn through a pair of bars or rollers which are spaced a predetermined fixed distance apart. The sheet of material 36 is a predetermined amount thinner than the liquid-carrying container 33 after it has been collapsed and substantially all the contained liquid expressed therefrom. It will thus be seen that if the composite photographic film unit of the present invention is processed by being drawn between a pair of rollers fixed apart a distance equal to the total thickness of the two walls of the envelope 10, the sheet of photosensitive material 24, the sheet of material 34, and the liquid-carrying container 33 in collapsed condition with substantially all the liquid expressed therefrom, the rollers will apply a mechanical stress to the liquid-carrying container 33, causing it to break open along its longitudinally sealed edge and will express substantially all the liquid therefrom. Continued movement of the composite photographic film unit between the rollers will cause them to generate a hydraulic pressure in the liquid composition which will spread said liquid composition in a uniform layer between the interface surfaces of the sheet of photosensitive material 24 and the sheet of material 34. The thickness of the layer of liquid deposited will depend upon the space between said interface surfaces as they pass between the rollers and that space is controlled by the thickness of the layer of material 36. The spaced bars or rollers employed to spread the liquid composition will preferably be grooved or relieved to permit the flaps 12, on each side of the envelope 10, to pass therebetween without affecting the thickness of the layer of liquid being spread.

In one satisfactory form of the invention the total thickness of the layer of photosensitive material and its supporting base layer is substantially .0065 inch, the thickness of the sheet of material 34 is substantially .0065 inch, the thickness of the black tab stock employed to form the envelope 10 and the light seal 30 is substantially .003 inch, the sheet of material 36 is substantially .002 to .004 inch thinner than the liquid-carrying container 33 after it has been collapsed, and the bottom edge 20 of the envelope 10 forms an angle of substantially 56° with the edge 18.

If the photosensitive material 24 comprises a diazonium photosensitive material the liquid carried by the liquid-carrying container 33 can be such that it will develop a visible positive image in said material 24. If the photosensitive material 24 comprises a standard silver halide photosensitive material the liquid reagent may develop a negative image therein and it may also fix the negative image. In a preferred form of the invention the liquid also creates a positive image of the latent negative image on the surface of a second sheet of material. If such a positive image is desired a liquid composition is preferably formed as set forth in the following nonlimiting example:

*Example 1*

|  | Grams |
|---|---|
| Water | 1860 |
| Sodium carboxymethyl cellulose | 93 |
| Sodium sulfite | 78 |
| Sodium hydroxide | 74.6 |
| Sodium thiosulfate | 14.5 |
| Citric acid | 38.5 |
| Hydroquinone | 52.0 |

It is preferred that the liquid-carrying container 33 be attached to the layer of photosensitive material 24. However, it will be appreciated that the container 33 may be attached to the sheet of material 34.

Figure 3:
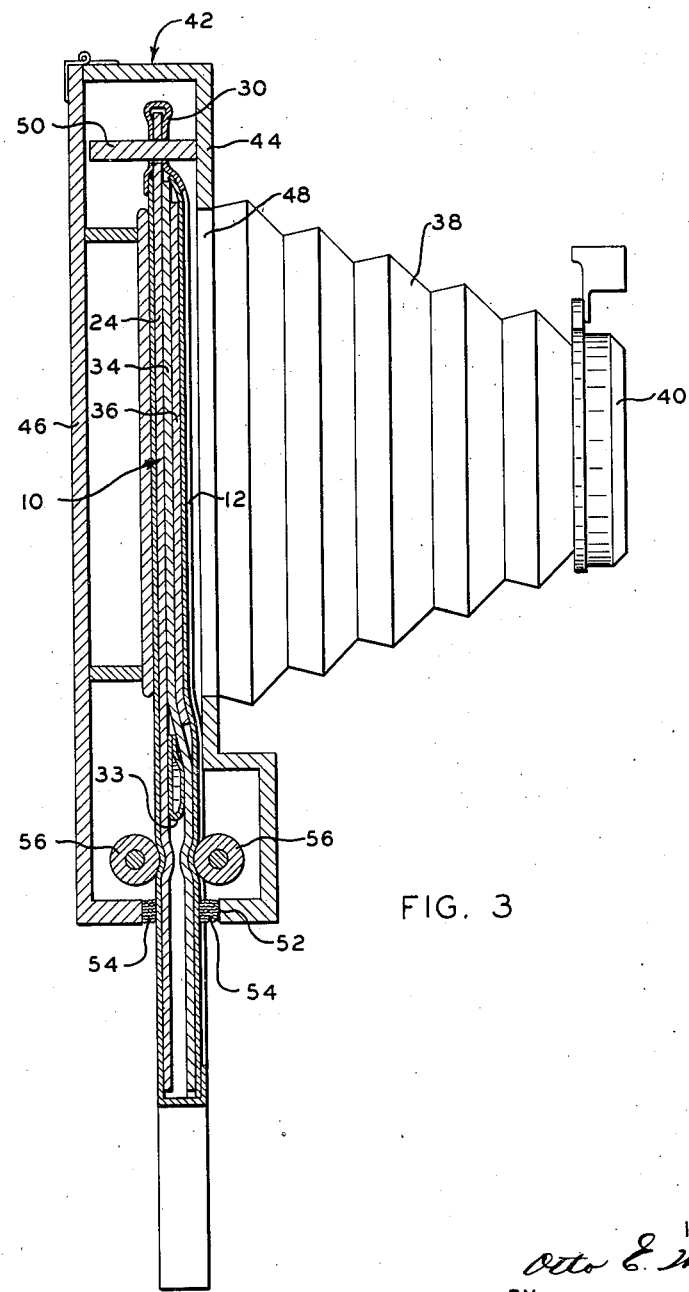
Fig. 3 is a view illustrating diagrammatically one form of apparatus in which the composite photographic film unit of the present invention may be exposed and processed.

Fig. 3 illustrates diagrammatically one form of apparatus in which the novel composite film unit of the present invention may be used. The apparatus of Fig. 3 comprises a camera having a conventional bellows 38 and lens and shutter assembly 40 which are attached to a camera back 42 comprising a housing 44 and a cover 46 hingedly mounted thereon. The housing 44 has an exposure aperture 48 formed therein and a pin 50 rigidly mounted on its inner surface adjacent the upper edge of said exposure aperture 48 and extending rearwardly thereof toward the cover 46. A slot 52 having a light seal 54 therein is provided in the bottom of the camera back 42 between the housing 44 and the cover 46. A pair of spaced pressure-applying members 56 are located inside of the camera back 42 adjacent to and on each side of the slot 52. The pressure-applying members 56 disclosed in Fig. 3 comprise a pair of rollers rotatably mounted a predetermined distance apart against movement toward or away from each other when the camera back 42 is in the operative position disclosed in Fig. 3. However, the pressure-applying members may comprise a pair of rigid bars that are held a predetermined distance apart against movement toward or away from each other, or a pair of bars or rollers that are urged toward each other by means of spring loading.

To load the novel composite film unit of the present invention in the apparatus disclosed in Fig. 3, the cover 46 is opened and one of the composite film units is placed in the housing 44 by inserting the pin 50 through the perforation 32 in the light seal 30 and photosensitive material 24. The cover 46 is then closed. The major portion of the composite film unit is then located in the camera back 42 with a length of the envelope 10 and a shorter length of the photosensitive sheet 24 therein extending out of said camera back 42 through pressure-applying members 56 and the slot 52.

To expose the photosensitive material 24 and process the latent negative image formed to form a visible positive image of said latent negative image on the sheet of material 34, the envelope 10 is grasped at its lowermost point, i. e., the lower right-hand corner as seen in Fig. 1, and the envelope and sheet of material 34 are pulled downwardly. Pulling the envelope 10 downwardly away from the sheet of photosensitive material 24 causes the two portions 28 on the upper edge of said photosensitive material 24 to cut or tear open the folded edge 14 of said envelope 10. After the edge 14 of the envelope 10 has been cut open, the envelope is pulled off from the photosensitive material 24 and out of the camera a sufficient distance to uncover the image area on the photosensitive material 24 which is located in back of the exposure aperture 48. The photosensitive material 24 is then exposed to actinic light by actuating the shutter 40 and the envelope 10 is pushed back into the camera back 42 and over the photosensitive material 24 to substantially the same position illustrated in Fig. 3. Following this, the lower end of the envelope 10 is again grasped but this time it is grasped substantially along its longitudinal center line so that the lower end of the sheet of photosensitive material 24 is engaged in addition to the envelope 10 and the sheet of material 34. The complete composite photographic film unit is then pulled downwardly to cause the sheet of photosensitive material 24 and the light seal 30 to tear away from the pin 50. After the photosensitive material 24 and the light seal 30 are torn free of the pin 50 the entire assembly is drawn from the camera between the pressure-applying members 56.

The distance between the pressure-applying members 56 exceeds the total thickness of the envelope 10, the photosensitive material 24 and the sheet of material 34 by a distance at least equal to two thicknesses of the multilayer sheet material from which the liquid-carrying container 33 is formed, but said distance does not exceed said total thickness by a distance equal to the thickness of the liquid-carrying container 33. Therefore, the act of drawing the composite photographic film unit between the pressure-applying members 56 causes said pressure-applying members 56 to exert a pressure on the liquid-carrying container 33, which pressure, in turn, causes said container 33 to rupture and discharge its contained liquid between the interface surfaces of the photosensitive layer 24 and the layer of material 34. Continued movement of the composite film unit between the pressure-applying members 56 causes them to spread the released liquid between said interface surfaces in a layer of uniform predetermined thickness to cause the above-mentioned reactions to take place. As above stated the thickness of the layer of liquid which is deposited between the interface surfaces of the sheet of photosensitive material 24 and the sheet of material 34 is controlled by the thickness of the sheet of material 36. After a sufficient length of time has elapsed after the composite photographic film unit is drawn through the pressure-applying means 56 for the desired reaction to take place, envelope 10 is torn apart and the layer of material 34 is peeled from the layer of photosensitive material 24 to give on the layer 34 a visible positive image of the latent negative image which was formed in the layer 24.

Whereas the use of the novel composite photographic film unit of the present invention has been disclosed in connection with a specific form of camera adapted to process said film unit as it is being drawn therefrom, it will be understood that the novel composite photographic film unit may be removed from the photographic apparatus and processed at some remote time or place by being passed through a pressure-applying means.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite photographic film unit comprising an envelope, and a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope.

2. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, and a light seal carried by said uncovered area on said photosensitive material and covering said notch.

3. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, and a second sheet of material in said envelope in face-to-face relation with said photosensitive material.

4. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, said photosensitive material having a predetermined area thereon adapted to have a latent image formed therein, and a liquid-carrying container carried by said photosensitive material adjacent to but outside of said image area.

5. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, said photosensitive material having a predetermined area thereon adapted to have a latent image formed therein, a second sheet of material in said envelope in face-to-face relation with said photosensitive material, and a liquid-carrying container mounted between said photosensitive material and said second sheet of material.

6. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, a second sheet of material in said envelope in face-to-face relation with said photosensitive material, and a third sheet of material in said envelope between said second sheet and one wall of said envelope.

7. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, said photosensitive material having a predetermined area thereon adapted to have a latent image formed therein, a second sheet of material in said envelope in face-to-face relation with said photosensitive material, a liquid-carrying container mounted between said photosensitive material and said second sheet of material adjacent to but outside of said image area, and a third sheet of material between said second sheet and a wall of said envelope.

8. A composite photographic film unit comprising an envelope, a sheet of photosensitive material in said envelope and slidably movable with respect thereto, said envelope comprising a sheet of material folded transversely thereof to form two walls joined by a folded edge, said sheet of material being opaque to light which is actinic to said photosensitive material, said folded edge having a notch therein, a predetermined area of said photosensitive material along one edge thereof being uncovered by said notch, said one edge of said photosensitive material adjacent to said uncovered area sloping away from said folded edge to form a cutting edge adapted to cut open said folded edge to permit the withdrawal of said photosensitive material from said envelope, a light seal carried by said uncovered area on said photosensitive material and covering said notch, said photosensitive material having a predetermined area thereon adapted to have a latent image formed therein, a second sheet of material in said envelope in face-to-face relation with said photosensitive material, a liquid-carrying container mounted on said photosensitive material adjacent to but outside of said image area, and a third sheet of material between said second sheet and a wall of the envelope.

OTTO E. WOLFF.

No references cited.

Certificate of Correction

Patent No. 2,472,358

June 7, 1949

OTTO E. WOLFF

It is hereby certified that errors appear in the printed specification of the above numbered patent requiring correction as follows:

Column 3, line 26, after the numeral "14" insert *is* ; column 7, line 56, after the word "therein" insert a comma;

and that the said Letters Patent should be read with these corrections therein that the same may conform to the record of the case in the Patent Office.

Signed and sealed this 2nd day of May, A. D. 1950.

[SEAL]

THOMAS F. MURPHY,
*Assistant Commissioner of Patents.*